(12) United States Patent
Ahmadein et al.

(10) Patent No.: US 10,142,787 B1
(45) Date of Patent: Nov. 27, 2018

(54) TRACKING LARGE NUMBERS OF WIRELESS TERMINALS BASED ON PREDICTING WHEN TO ISSUE LOCATION REQUESTS

(71) Applicant: Polaris Wireless, Inc., Mountain View, CA (US)

(72) Inventors: Ahmed Mohamed Ahmadein, Mountain House, CA (US); Rodrigo Gregorio Alonso, Gilroy, CA (US); Robert Alan Iannucci, Palo Alto, CA (US)

(73) Assignee: Polaris Wireless, Inc., Mountain View, CA (US), s ( * ) Notice: Subject to any disclaimer, the term of this patent is extended or adjusted under 35 U.S.C. 154(b) by 3 days.

(21) Appl. No.: 15/675,754

(22) Filed: Aug. 13, 2017

(51) Int. Cl.
*H04W 88/02* (2009.01)
*H04W 4/02* (2018.01)
*H04W 60/04* (2009.01)
*H04W 64/00* (2009.01)

(52) U.S. Cl.
CPC ........... *H04W 4/025* (2013.01); *H04W 60/04* (2013.01); *H04W 64/003* (2013.01)

(58) Field of Classification Search
CPC .... H04W 4/025; H04W 60/04; H04W 64/003
See application file for complete search history.

(56) References Cited

U.S. PATENT DOCUMENTS

| 2014/0003282 A1 | 1/2014 | Kafle et al. |
| 2015/0201420 A1* | 7/2015 | Martone ............. H04L 27/0006 370/252 |
| 2016/0142883 A1* | 5/2016 | Zou ....................... H04W 4/028 455/456.1 |
| 2017/0303333 A1 | 10/2017 | Zhao et al. |
| 2017/0307723 A1 | 10/2017 | Edge et al. |
| 2017/0371024 A1* | 12/2017 | Ivanov .................. G01S 5/0252 |

OTHER PUBLICATIONS

USPTO, "Notice of Allowance," "Examiner's Amendment," "Examiner's statement of reasons for allowance," and accompanying pages, U.S. Appl. No. 15/675,755, dated Mar. 1, 2018.

\* cited by examiner

*Primary Examiner* — Pakee Fang
(74) *Attorney, Agent, or Firm* — McGeary Cukor LLC; Kenneth Ottesen; Jason Paul DeMont

(57) ABSTRACT

An apparatus and method for tracking a large number of wireless terminals being used by wireless subscribers and for estimating the location of the terminals at each instant. Some embodiments of the present invention use a combination of cluster analysis, interpolation of information between identified clusters, and averaging of the interpolated information, in order to predict when it might be beneficial to issue a location request to a location engine, for each subscriber.

19 Claims, 14 Drawing Sheets

700

TRACKING LARGE NUMBERS OF WIRELESS TERMINALS BASED ON PREDICTING WHEN TO ISSUE LOCATION REQUESTS

FIELD OF THE INVENTION

The present invention relates to telecommunications in general, and, more particularly, to wireless location systems.

BACKGROUND OF THE INVENTION

FIG. 1 depicts a diagram of the salient components of wireless telecommunications system 100 in accordance with the prior art. Wireless telecommunications system 100 comprises: wireless terminals 101-1, 101-2, 101-3, and 101-4, cellular base stations 102-1, 102-2, and 102-3, Wi-Fi base stations 103-1 and 103-2, and wireless infrastructure 111, interconnected as shown. Wireless telecommunications system 100 provides wireless telecommunications service to all of geographic region 120.

The salient advantage of wireless telecommunications over wireline telecommunications is the mobility that is afforded to wireless service subscribers, who are the users of the wireless telecommunications system. On the other hand, the salient disadvantage of wireless telecommunications lies in that fact that because the wireless terminals are mobile, an interested party might not be able to readily ascertain the location of a terminal.

Such interested parties might include both i) the wireless service subscriber using the wireless terminal and ii) remote parties. There are a variety of reasons why the subscriber might be interested in knowing his or her own location. For example, the subscriber might be interested in telling a remote party where he or she is. Or the subscriber might be interested in knowing how to navigate from where he or she is to another location.

There are a variety of reasons why a remote party might be interested in knowing the location of the subscriber. For example, the recipient of a 911 emergency call from a wireless terminal might be interested in knowing the location of the terminal so that emergency services vehicles can be dispatched to that location.

A variety of techniques are known in the prior art for locating a wireless terminal. The wireless terminal can be tracked by using any of these techniques repetitively. In general, the confidence with which a tracking system can estimate the location of a wireless terminal at any instant is a function of the frequency at which the location is determined and the mobility of the terminal. This is because the tracking system must estimate the location of the terminal for those instants between when the terminal is actually located. The longer the interval between when the terminal is located, the less confidence the tracking system can have in estimating the location at each instant during the interval. Therefore, the confidence with which a tracking system can estimate the location of a wireless terminal at any instant is a function of the frequency at which the terminal is actually located.

Although repeating a prior-art location technique over and over frequently might be practical for tracking one wireless terminal, it is not practical for tracking a large number of terminals. The reason is that the process of locating a wireless terminal consumes limited resources—such as wireline and wireless bandwidth—and those resources are quickly exhausted when the location is re-determined frequently for a large number of terminals.

The location of large numbers of wireless terminals at each instant does not necessarily require that the location of each terminal be re-determined frequently. This is because there are situations in which the location of a wireless terminal can be stated, with an acceptable degree of confidence, even though the location of the terminal is re-determined less frequently. For example, when the empirical evidence suggests that the wireless terminal is stationary or moving slowly, then the frequency with which the terminal is located can be reduced. As another example, when a tracking system in the prior art observes that a wireless terminal is "home" 99% of the time from Midnight to 6:00 AM, it is reasonable—absent other factors—to locate that wireless terminal infrequently from Midnight to 6:00 AM and yet estimate, with an acceptable degree of confidence, that the terminal is home at each instant between Midnight and 6:00 AM. In contrast, when a tracking system observes that a wireless terminal is "home" 11% of the time from Midnight to 6:00 AM, it is not reasonable to locate that wireless terminal infrequently from Midnight to 6:00 AM and yet to estimate that the terminal is at home at each instant between Midnight and 6:00 AM.

Although various techniques in the prior art attempt to reduce the rate at which the locations of large numbers of terminals are re-determined, the overall tracking process can still exhaust the limited resources that are utilized.

SUMMARY OF THE INVENTION

When a geographic region comprises a large number of wireless terminals, the present invention enables each of the terminals—and, by association, their corresponding subscribers—to be tracked more efficiently than with at least some techniques in the prior art, and without some of the costs and disadvantages for doing so in the prior art. A data-processing system that is disclosed herein achieves this efficiency, in part, through a combination of cluster analysis, interpolation of information between identified clusters, and averaging of the interpolated information, in order to predict when it might be beneficial to issue a location request to a location engine, for each subscriber of a large number of subscribers in a wireless network.

The system of the illustrative embodiment performs, for each subscriber, a cluster analysis on the user location information (ULI) data accumulated for the subscriber, in order to identify one or more "clusters" that are representative of locations that are frequented by the subscriber. Various clusters can correspond to the subscriber's "home" and "workplace", and also to other places that are frequented by the subscriber. The system identifies the clusters as a function of time, which enables further processing in accordance with the illustrative embodiment. For example, the disclosed system can represent the cluster data such that it can be easily discerned that a first subscriber was at home between 11:00 pm and 8:00 am on a known date or on a known day of the week in the past, was at the workplace between 9:30 am and 6:00 pm, and was possibly associated with other clusters at other times and days as well.

The disclosed system then estimates, based on the identified clusters, the locations of each subscriber at various times of day and dates that are not associated with any of the identified clusters. As part of estimating these locations, the system also determines a confidence value associated with each possible location at the various times of day.

By estimating these possible locations with their accompanying confidence values, the system essentially "interpolates" information in between the clusters that were previously identified using the actual, ULI data associated with the subscriber. The inventors have observed that this interpolating in between the identified clusters advantageously achieves a performance improvement over not performing the interpolation, especially when coupled with the subsequent operations disclosed herein.

Once the disclosed system has the interpolated information for a subscriber, the system averages for each possible location (e.g., "home", "workplace", "in transit", "unknown", etc.), for each time of day, and over a plurality of days (e.g., the past 10 Tuesdays, etc.), the respective confidence values for the subscriber. In essence, the system attempts to predict, for a given subscriber and time of day, where the subscriber might be, based on the averaged information.

The disclosed system then estimates when the location of a subscriber exceeds a predefined, non-zero level of uncertainty, as a function of time, based on the averaged confidence values. Consequently, the system determines when it might be optimal to transmit a location request to a location engine, corresponding to the subscriber, in that the transmitting of the location request is based on the estimate of when the location exceeds the predefined level of uncertainty, thereby warranting that a location determination be performed.

An illustrative method comprises: receiving, by a data-processing system, a first non-empty set of user location information (ULI) data for a first subscriber; identifying, by the data-processing system, a plurality of clusters for the first subscriber, by performing a cluster analysis on the first set of ULI data such that the clusters in the plurality of clusters are representative of location of the first subscriber and are identified as a function of time; estimating, by the data-processing system, when the location of the first subscriber exceeds a predefined, non-zero level of uncertainty, as a function of time, based on the plurality of clusters for the first subscriber; and transmitting, by the data-processing system, a first location request to a location engine, corresponding to the first subscriber, wherein the transmitting of the first location request is based on an estimate of when the location exceeds the predefined level of uncertainty.

Another illustrative method comprises: receiving, by a data-processing system, a first non-empty set of user location information (ULI) data for a first subscriber; identifying, by the data-processing system, a plurality of clusters for the first subscriber, by performing a cluster analysis on the first set of ULI data such that the clusters in the plurality of clusters are representative of location of the first subscriber and are identified as a function of time; estimating, based on the plurality of clusters, the locations of the first subscriber at respective times of day that are not associated with any of the clusters in the plurality; estimating, by the data-processing system, when the location of the first subscriber exceeds a predefined, non-zero level of uncertainty, as a function of time, based on the estimated locations of the first subscriber at the respective times of day; and transmitting, by the data-processing system, a first location request to a location engine, corresponding to the first subscriber, wherein the transmitting of the first location request is based on an estimate of when the location exceeds the predefined level of uncertainty.

Yet another illustrative method comprises: receiving, by a data-processing system, a first non-empty set of user location information (ULI) data for a first subscriber; identifying, by the data-processing system, a plurality of clusters for the first subscriber, by performing a cluster analysis on the first set of ULI data such that the clusters in the plurality of clusters are representative of location of the first subscriber and are identified as a function of time; estimating, based on the plurality of clusters, the locations of the first subscriber at respective times of day that are not associated with any of the clusters in the plurality, including a first time of day, resulting in a confidence value associated with a first possible location at the first time of day on a first calendrical date; averaging, over a plurality of days, the respective confidence values on each of the days in the plurality and that are associated with the first possible location of the first subscriber at the first time of day, including the confidence value associated with the first calendrical date; estimating, by the data-processing system, when the location of the first subscriber exceeds a predefined, non-zero level of uncertainty, as a function of time, based on the averaged confidence values; and transmitting, by the data-processing system, a first location request to a location engine, corresponding to the first subscriber, wherein the transmitting of the first location request is based on an estimate of when the location exceeds the predefined level of uncertainty.

DETAILED DESCRIPTION

For the purposes of this specification, the following terms and their inflected forms are defined as follows:

The term "calendrical time" is defined as indicative of one or more of the following:
(i) a time of day (e.g., 16:23:58, etc.),
(ii) one or more temporal designations (e.g., Tuesday, November, etc.),
(iii) one or more temporal events (e.g., Thanksgiving, John's birthday, etc.), and
(iv) a time span (e.g., 8:00 PM to 9:00 PM, etc.).

The term "exceed" is defined as to "be greater than" or to "be greater than or equal to."

The term "location" is defined as a zero-dimensional point, a one-dimensional line, a two-dimensional area, or a three-dimensional volume.

The term "plurality" is defined as meaning "more than one."

The term "skip" is defined as meaning to "pass over part of a sequence of data."

Figure 1:
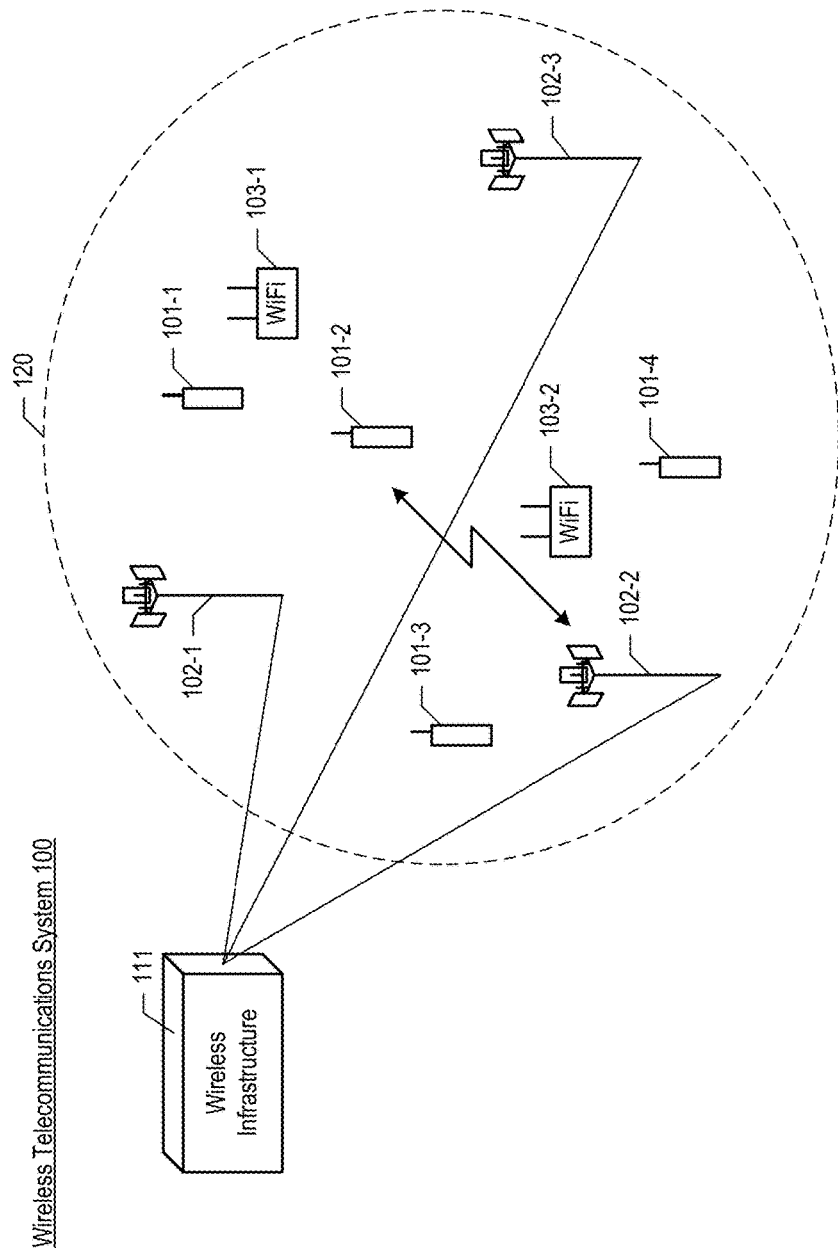
FIG. 1 depicts a diagram of the salient components of wireless telecommunications system 100 in accordance with the prior art.
Figure 2:
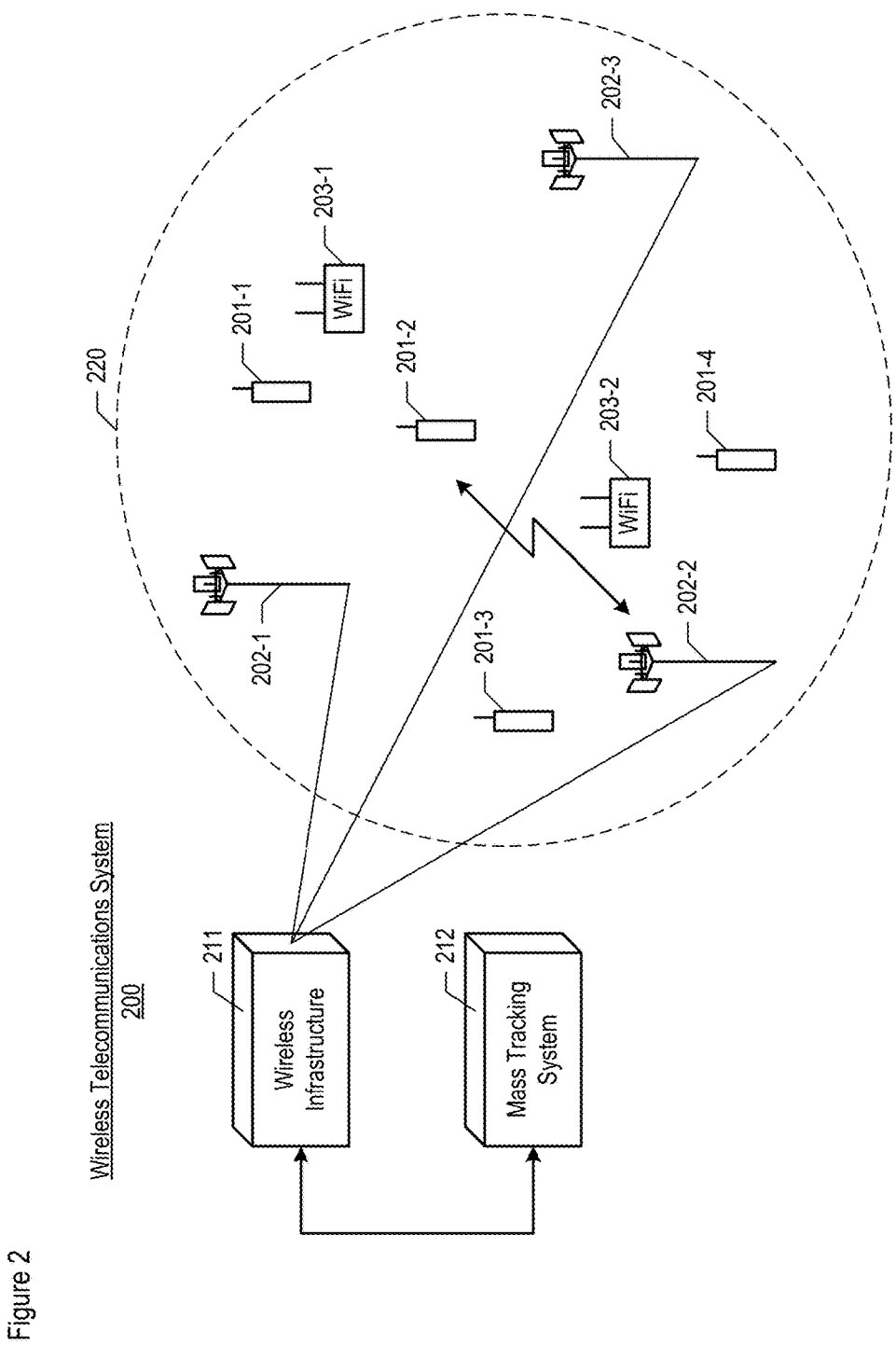
FIG. 2 depicts a schematic diagram of the salient components of wireless telecommunications system 200 in accordance with the illustrative embodiment of the present invention.

FIG. 2 depicts a schematic diagram of the salient components of wireless telecommunications system 200 in accordance with the illustrative embodiment of the present invention. As shown in FIG. 2, wireless telecommunications system 200 comprises wireless terminals 201-1, 201-2, 201-3, 201-4, cellular base stations 202-1, 202-2, and 202-3, Wi-Fi base stations 203-1 and 203-2, wireless infrastructure 211, and mass tracking system 212, interrelated as shown.

Wireless infrastructure 211, mass tracking system 212, cellular base stations 202-1 through 202-4, and Wi-Fi base stations 203-1 and 203-2 are all connected to one or more interconnected computer networks (e.g., the Internet, a local-area network, a wide-area network, etc.) and, as such, can exchange data in well-known fashion.

Wireless terminal 201-$k$, wherein k as depicted has a value of between 1 and 4, comprises the hardware and software necessary to perform the processes described below. Furthermore, wireless terminal 201-$k$ is mobile and can be at any location within geographic region 220 at any time.

Wireless terminal 201-$k$ can provide bi-directional voice, data, and video telecommunications service to a subscriber user (not shown), but it will be clear to those skilled in the art, after reading this disclosure, how to make and use embodiments of the present invention in which wireless terminal 201-$k$ provides a different set of services.

In accordance with the illustrative embodiment, wireless terminal 201-$k$ can transmit one or more radio signals—that can be received by one or more of base stations 202-1, 202-2, and 202-3 and Wi-Fi base stations 203-1 and 203-2—in accordance with specific parameters (e.g., signal strength, frequency, coding, modulation, timing offset, etc.), in well-known fashion. At least some of those parameters are provided to a location engine such as location engine 302 depicted in FIG. 3. Additionally, wireless terminal 201-$k$ can receive one or more radio signals from each of base stations 202-1, 202-2, and 202-3 and Wi-Fi base stations 203-1 and 203-2, in well-known fashion.

Wireless terminal 201-$k$ is also capable of identifying each radio signal it receives, in well-known fashion. The identification of each signal is provided to the location engine. Wireless terminal 201-$k$ is further capable of measuring one or more location-dependent traits of each radio signal it receives, in well-known fashion. Each measurement it generates is provided to the location engine. Unless explicitly stated, a wireless terminal is considered to be a proxy of its subscriber in the contexts of determining location and tracking.

Although the illustrative embodiment depicts wireless telecommunications system 200 as comprising four wireless terminals, it will be clear to those skilled in the art, after reading this disclosure, how to make and use alternative embodiments of the present invention that comprise any number of wireless terminals 201-1 through 201-K, wherein K is a positive integer.

Cellular base stations 202-1, 202-2, and 202-3 communicate with wireless infrastructure 211 and with each wireless terminal 201-$k$ in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 202-1, 202-2, and 202-3 are terrestrial, immobile, and base station 202-3 is within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Cellular base stations 202-1, 202-2, and 202-3 comprise the hardware and software necessary to be 3GPP-compliant and to perform the processes described below. For example and without limitation, each of cellular base stations 202-1, 202-2, and 202-3 are capable of continually:

i. receiving one or more radio signals transmitted by each wireless terminal 201-$k$, and ii. identifying each radio signal transmitted by each wireless terminal 201-$k$, in well-known fashion, and of transmitting the identity of those signals to the location engine, and iii. measuring one or more location-dependent traits of each radio signal transmitted by each wireless terminal 201-$k$, in well-known fashion, and of transmitting the measurements to the location engine, and iv. transmitting one or more signals to each wireless terminal 201-$k$ in accordance with specific parameters (e.g., signal strength, frequency, coding, modulation, etc.), in well-known fashion, and of transmitting those parameters to the location engine.

It will be clear to those skilled in the art how to make and use cellular base stations 202-1, 202-2, and 202-3.

Wi-Fi base stations 203-1 and 203-2 communicate with each wireless terminal 201-$k$ via radio in well-known fashion. Wi-Fi base stations 203-1 and 203-2 are terrestrial, immobile, and within geographic region 220. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 203-1 and 203-2 are capable of continually:

i. receiving one or more radio signals transmitted by each wireless terminal 201-*k*, and
ii. identifying each radio signal transmitted by each wireless terminal 201-*k*, in well-known fashion, and of transmitting the identity of those signals to the location engine, and
iii. measuring one or more location-dependent traits of each radio signal transmitted by each wireless terminal 201-*k*, in well-known fashion, and of transmitting the measurements to the location engine, and
iv. transmitting one or more signals to each wireless terminal 201-*k* in accordance with specific parameters (e.g., signal strength, frequency, coding, modulation, etc.), in well-known fashion, and of transmitting those parameters to the location engine.

It will be clear to those skilled in the art how to make and use Wi-Fi base stations 203-1 and 203-2.

Wireless infrastructure 211 comprises a switch that orchestrates the provisioning of telecommunications service to each wireless terminal 201-*k* and the flow of information to and from the location engine, as described below and in the accompanying figures. As is well known to those skilled in the art, wireless switches are also commonly referred to by other names such as mobile switching centers, mobile telephone switching offices, routers, and so on, for example and without limitation.

Mass tracking system 212 is a data-processing system comprising hardware and software that is capable of:
i. receiving data that is evidence of the location of wireless terminal 201-*k*;
ii. transmitting maintenance and operational requests to wireless infrastructure 211 (e.g., mobile terminated location requests, SMS messages, calling the mobile, etc.); and
iii. using data that is evidence of the location of wireless terminal 201-*k* to locate wireless terminal 201-*k* in geographic region 220; and
iv. estimating the location of wireless terminal 201-*k* at every instant.

Mass tracking system 212 is described in detail below and in FIG. 3.

Figure 3:
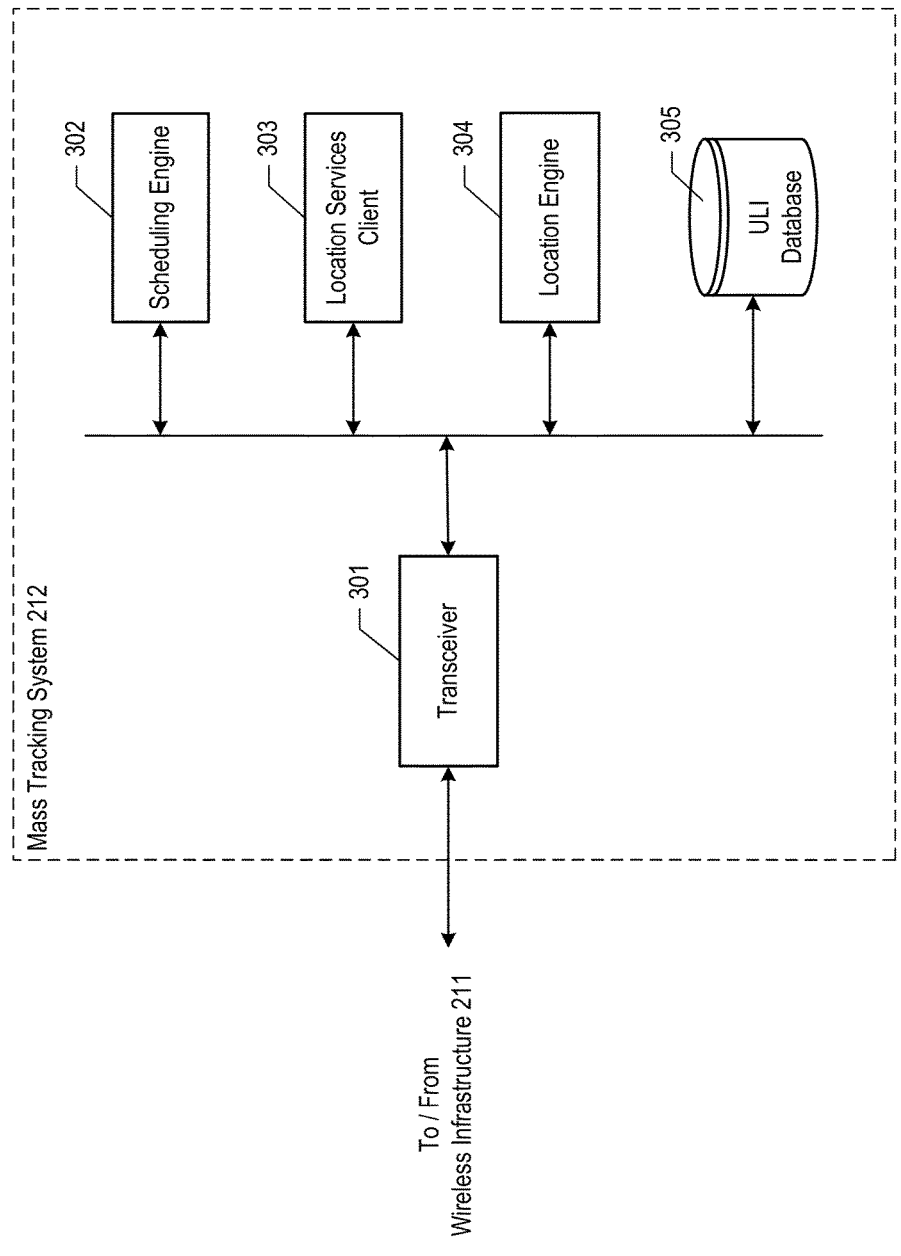
FIG. 3 depicts a block diagram of the salient components of mass tracking system 212 in telecommunications system 200.

FIG. 3 depicts a block diagram of the salient components of mass tracking system 212, in accordance with the illustrative embodiment. Mass tracking system 212 comprises: transceiver 301, scheduling engine 302, location services (LCS) client 303, location engine 304, and user location information (ULI) database 305, interrelated as shown. In some embodiments of the present invention, two or more of these data-processing systems can be combined.

Transceiver 301 is hardware and software that can transmit signals to and receive signals from wireless switching center 212, in well-known fashion. These signals include, but are not limited to, requests for evidence of the location of a wireless terminal, including location services (LCS) requests, and data that are evidence of the location of a wireless terminal. It will be clear to those skilled in the art how to make and use transceiver 301.

Scheduling Engine 302 is hardware and software that can perform the functionality described below and in the accompanying figures, including the functionality described in accordance with operation 503. Scheduling engine 302 schedules one or more LCS requests to be transmitted by LCS client 303, based on mobile terminated location requests (MT-LR) that engine 302 generates as described below. In accordance with the illustrative embodiment, scheduling engine 302 is implemented on a data-processing system made up of one or more server computers.

Location Services (LCS) Client 303 is hardware and software that can perform the functionality described below and in the accompanying figures, including the issuing of LCS requests to location engine 304 based on the MT-LRs that are prioritized by scheduling engine 302. LCS client 303 is also capable of receiving location estimates from location engine 304 and updating ULI database 305 based on the location estimates. In accordance with the illustrative embodiment, LCS client 303 is implemented on a data-processing system made up of one or more server computers.

Location engine 304 is hardware and software that can receive evidence of the location of a wireless terminal (e.g., a serving cell ID, a set of signal-strength measurements that the wireless terminal receives from neighboring cells' base stations, etc.) and determines the location of the wireless terminal based on the evidence of location, in accordance with operation 505. It will be clear to those skilled in the art how to make and use location engine 304. For example, the location engine suitable for use with the present invention is taught in U.S. Pat. No. 7,257,414, which is incorporated herein by reference. In some embodiments of the present invention, location engine 304 comprises a mobile location center (MLC), as is known in the art, or equivalent. In accordance with the illustrative embodiment, location engine 304 is implemented on a data-processing system made up of one or more server computers.

ULI database 305 is a structured set of data in a non-volatile memory that stores user location information, comprising the most recent and prior estimates of the locations of wireless terminals 201-1, 201-2, 201-3, and 201-4. In accordance with the illustrative embodiment, ULI database 305 is implemented on a data-processing system made up of one or more server computers.

As will be appreciated by those skilled in the art, in some embodiments of the present invention ULI database 305 might be a relational database, while in some other embodiments of the present invention, ULI database 305 might be another type of database (e.g., an object-oriented database, a hierarchical database, etc.), while in still other embodiments of the present invention, ULI database 305 might be another type of data store that does not necessarily support the type of query processing typically offered by databases (e.g., an unstructured file, a simple contiguous block of random-access memory, etc.). In any case, it will be clear to those skilled in the art, after reading this disclosure, how to construct, populate, and use ULI database 305.

ULI data is accumulated as a result of one or more user events occurring, such as, while not being limited to:
i. originating a voice call from a wireless terminal,
ii. setting up a voice call to a wireless terminal,
iii. originating an SMS text from a wireless terminal,
iv. transmitting an SMS text to a wireless terminal,
v. transmitting a data packet from a wireless terminal,
vi. transmitting a data packet to a wireless terminal,
vii. a location update (LU) being performed by a wireless terminal,
viii. an international mobile subscriber identity (IMSI) attach being performed by a wireless terminal,
ix. an IMSI detach being performed by a wireless terminal, and
x. a signal measurement report being transmitted by a wireless terminal.

In some embodiments of the present invention, information related to these events is also stored as part of the ULI data, in addition to the location estimates derived from these events.

In some embodiments of the present invention, ULI data does not include any location information obtained via MT-LRs. In some other embodiments, ULI data can include location information obtained via MT-LRs, including MT-LRs that are generated independently of the MT-LR optimization disclosed herein, or MT-LRs that are generated based on the MT-LR optimization disclosed herein, or both.

Figure 4:
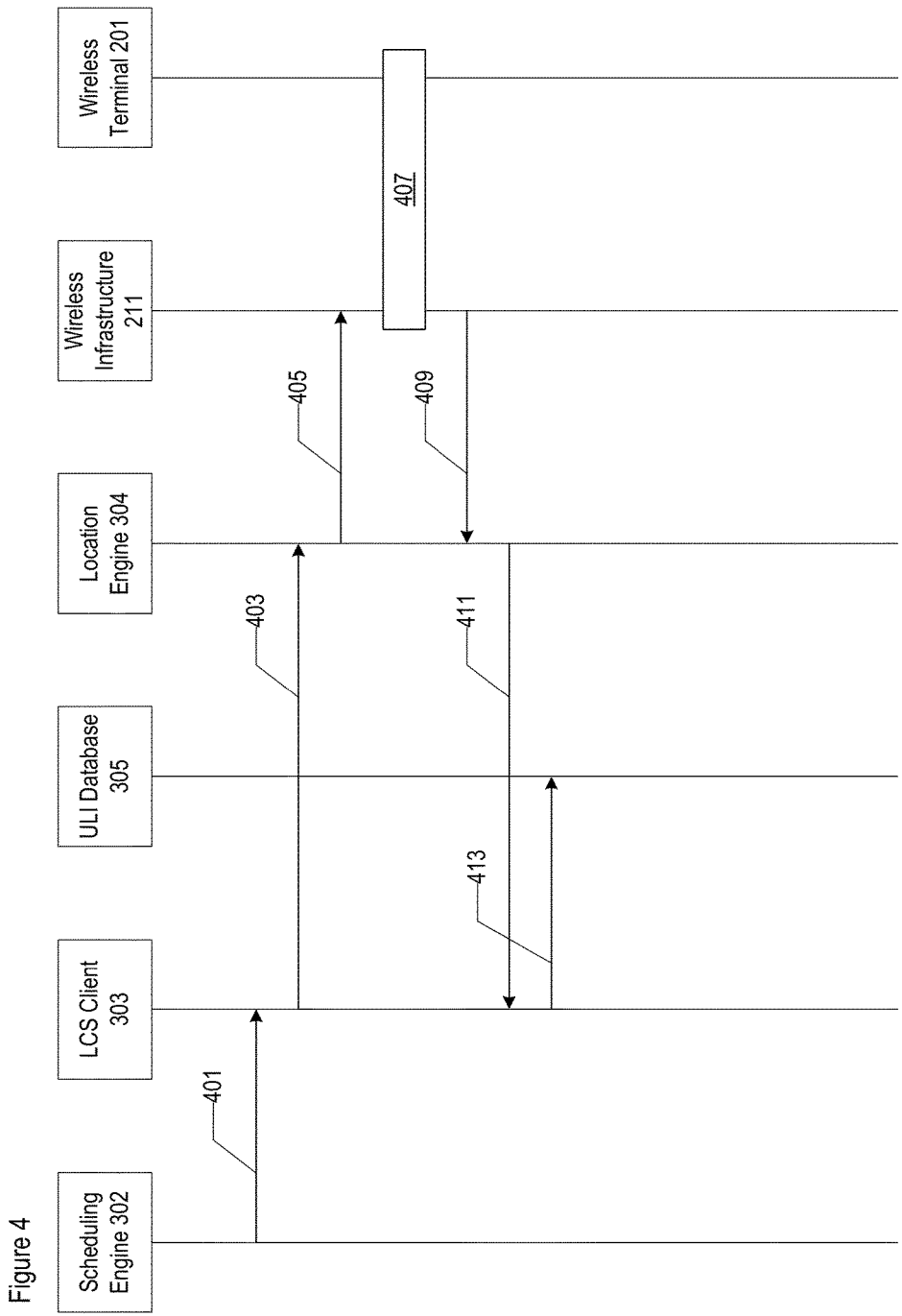
FIG. 4 depicts a message flow diagram of a mobile terminated location request (MT-LR) scenario involving mass tracking system 212.

FIG. 4 depicts a message flow diagram of a mobile terminated location request (MT-LR) scenario. In accordance with the illustrative embodiment, an MT-LR comprises a message flow that allows LCS client 303 to issue an LCS request to location engine 304, which in response can transmit, to wireless infrastructure 211, a request for evidence of the location of a wireless terminal. The request for evidence results in the wireless terminal being paged; when the paged wireless terminal responds to the page, the response—which is monitored by wireless infrastructures 211's IuB probe, for example—provides evidence of the wireless terminal's location (e.g., the serving cell's ID, the intra- and inter-frequency measurement reports, etc.). The request for evidence of the location of a wireless terminal can also be an SMS message or a voice call directed to the wireless terminal.

In some embodiments of the present invention, an MT-LR also results in a location estimate being stored in ULI database 305, as described below.

In the message flow, scheduling engine 302 transmits a mobile terminated request (MT-LR) trigger 401 to LCS client 303. The circumstances in which scheduling engine 302 transmits MT-LR trigger 401 to LCS client 303 are described below and in the accompanying figures. MT-LR trigger 401 is also referred to as a "location request." As those who are skilled in the art will appreciate after reading this specification, a different type of location request than an MT-LR can be issued for triggering a location determination session.

In response to receiving MT-LR trigger 401, LCS client 303 transmits location service (LCS) request 403 to location engine 304, which can be a gateway mobile location center (GMLC), for example and without limitation.

In response to receiving location service (LCS) request 403, location engine 304 transmits one or more messages 405 to wireless infrastructure 211.

In response to receiving messages 405, wireless infrastructure 211 performs MT-LR procedures 407 involving wireless terminal 201 whose location is being requested.

In response to procedure 407 having been performed, wireless infrastructure 211 transmits data 409, representing evidence of a location of wireless terminal 201, to location engine 304. Location engine 304 then uses data 409 to determine an estimate of the location of wireless terminal 201.

In response to receiving data 409, location engine 304 transmits location service response 411 to LCS client 303. Location service response 411 comprises the estimate of the location of wireless terminal 201.

In response to receiving location service response 411, LCS client 303 updates ULI database 305 with estimate 413 of the location of wireless terminal 201.

Figure 5:
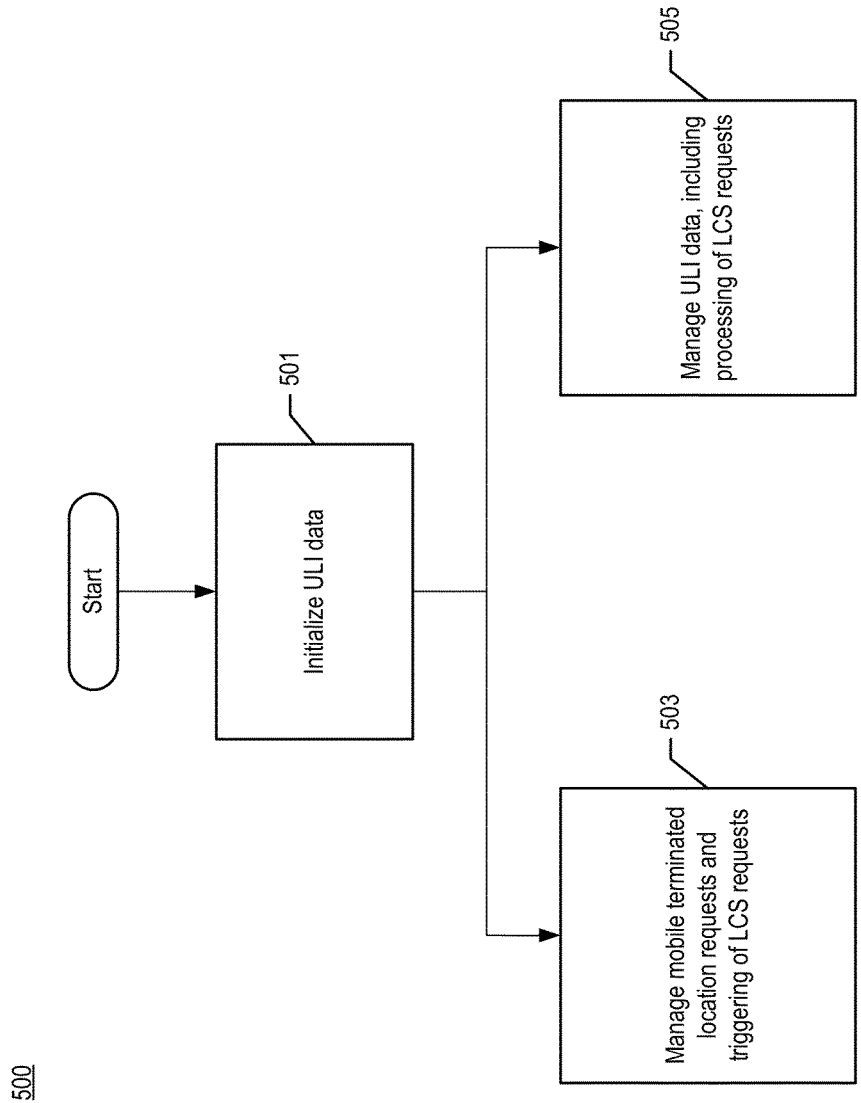
FIG. 5 depicts a flowchart of the salient tasks in method 500 performed by mass tracking system 212.

FIG. 5 depicts a flowchart of the salient tasks in method 500 performed by mass tracking system 212. Operation 501 is performed first and then operations 503 and 505 are performed frequently and concurrently. It will be clear to those skilled in the art, after reading this disclosure, how to make and use embodiments of the present invention in which the tasks are not performed frequently or concurrently. It will also be clear to those having ordinary skill in the art, after reading the present disclosure, how to make and use alternative embodiments of method 500, as well as the other methods disclosed in this specification, wherein the recited operations sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

In accordance with operation 501, the ULI data in database 305 is initialized with available user location data for one or more of wireless terminals 201-1 through 201-4. In some alternative embodiments of the present invention, the initialization of database 305 is skipped, and operation 501 serves mainly to trigger the commencing of operations 503 and 505.

In accordance with operation 503, scheduling engine 302 assesses the need for location requests for various wireless subscribers and maintains an MT-LR queue. Scheduling engine 503 uses the MT-LR queue to organize the mobile terminated location requests that are to be acted upon by LCS client 303 in engaging location engine 304 via LCS requests. Operation 503 is further described below and in regard to FIG. 6 and elsewhere.

Scheduling engine 302 frequently performs operation 503 at a rate that takes into consideration the burden that the requests place on the bandwidth of the paging channel and wireless telecommunications system 200's other resources.

In accordance with operation 505, location engine 304 processes each LCS request by transmitting a request to wireless infrastructure 211 for receiving a datum that is evidence of the location of a wireless terminal. For each request it sends to infrastructure 211, location engine 304 can receive a datum that is evidence of the location of a wireless terminal. The datum might be received in response to having received an LCS request, or, alternatively, it might be received spontaneously and without a request for it.

In either case, location engine 304 determines the location of the wireless terminal based on that datum and possibly other data that are evidence of the location. In some cases, a highly accurate estimate (e.g., within 100 meters, etc.) of the location of the wireless terminal is desired and, in those cases, location engine 304 will generate a highly accurate estimate. In some cases, a less-accurate estimate (e.g., the reported Cell-ID of a recent serving Cell, etc.) of the location of the wireless terminal is acceptable and, in those cases, location engine 304 will generate that estimate. Location engine 304 then transmits the estimate of the location of the wireless terminal back to LCS client 303, which stores it in ULI database 305 for later analysis.

Figure 6:
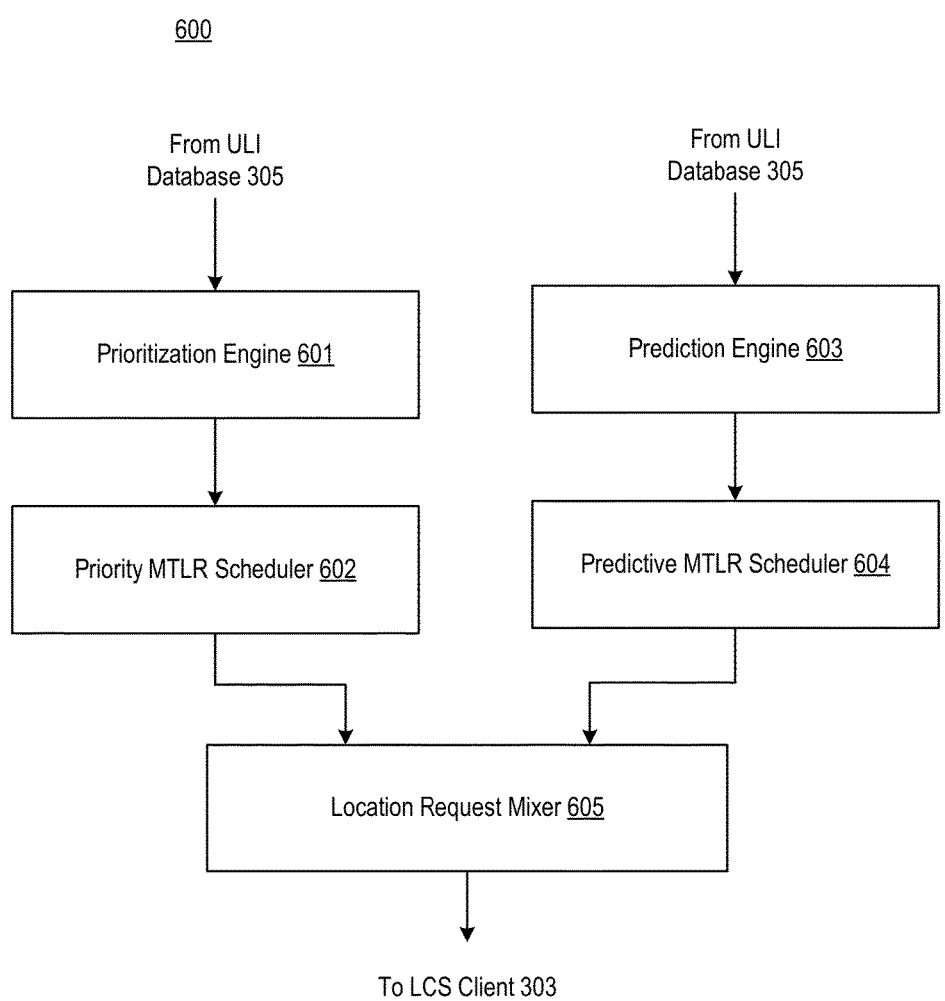
FIG. 6 depicts the processing modules associated with operation 503 for managing mobile terminated location requests.

FIG. 6 depicts the processing modules (e.g., software, hardware, etc.) associated with operation 503 for managing mobile terminated location requests, performed in accordance with the illustrative embodiment. As those who are skilled in the art will appreciate after reading this specification, a different arrangement of processing modules can be used to implement at least some of the operations disclosed herein.

Prioritization engine 601 provides the functionality associated with scoring and ranking various wireless subscribers, as described below and in regard to FIGS. 7 and 8. Prioritization engine 601 receives ULI data from database 305 and provides a ranking of the subscribers to priority MT-LR scheduler 602.

Priority MT-LR scheduler 602 provides the functionality associated with scheduling MT-LR triggers to be sent, based on the ranking of the subscribers it receives from prioritization engine 601. The operations associated with scheduler 602 are described below and in regard to FIG. 9. Priority MT-LR scheduler 602 provides the scheduled MT-LR triggers to location request mixer 605.

Prediction engine 603 provides the functionality associated with predicting when MT-LR triggers should be sent for various wireless subscribers, as described below and in regard to FIG. 10. Prediction engine 603 receives ULI data from database 305 and provides an estimate, to predictive MT-LR scheduler 604, of when the location of a subscriber exceeds a predefined level of uncertainty, thereby necessitating an MT-LR trigger be transmitted.

Predictive MT-LR scheduler 604 provides the functionality associated with scheduling MT-LR triggers to be sent, based on the estimate of location uncertainty it receives from predictive engine 603. The operations associated with scheduler 604 are described below and in regard to FIG. 14. Predictive MT-LR scheduler 604 provides the scheduled MT-LR triggers to location request mixer 605.

Location request mixer 605 provides the functionality associated with transmitting MT-LR triggers, based on the triggers it receives from priority MT-LR scheduler 602 and predictive MT-LR scheduler 604, and subject to certain constraints disclosed herein. The operations associated with mixer 605 are described below and in regard to FIG. 15. Location request mixer 605 transmits the MT-LR triggers to LCS client 303. In some alternative embodiments of the present invention, mixer 605 can transmit the triggers to a different data-processing system.

Figure 7:
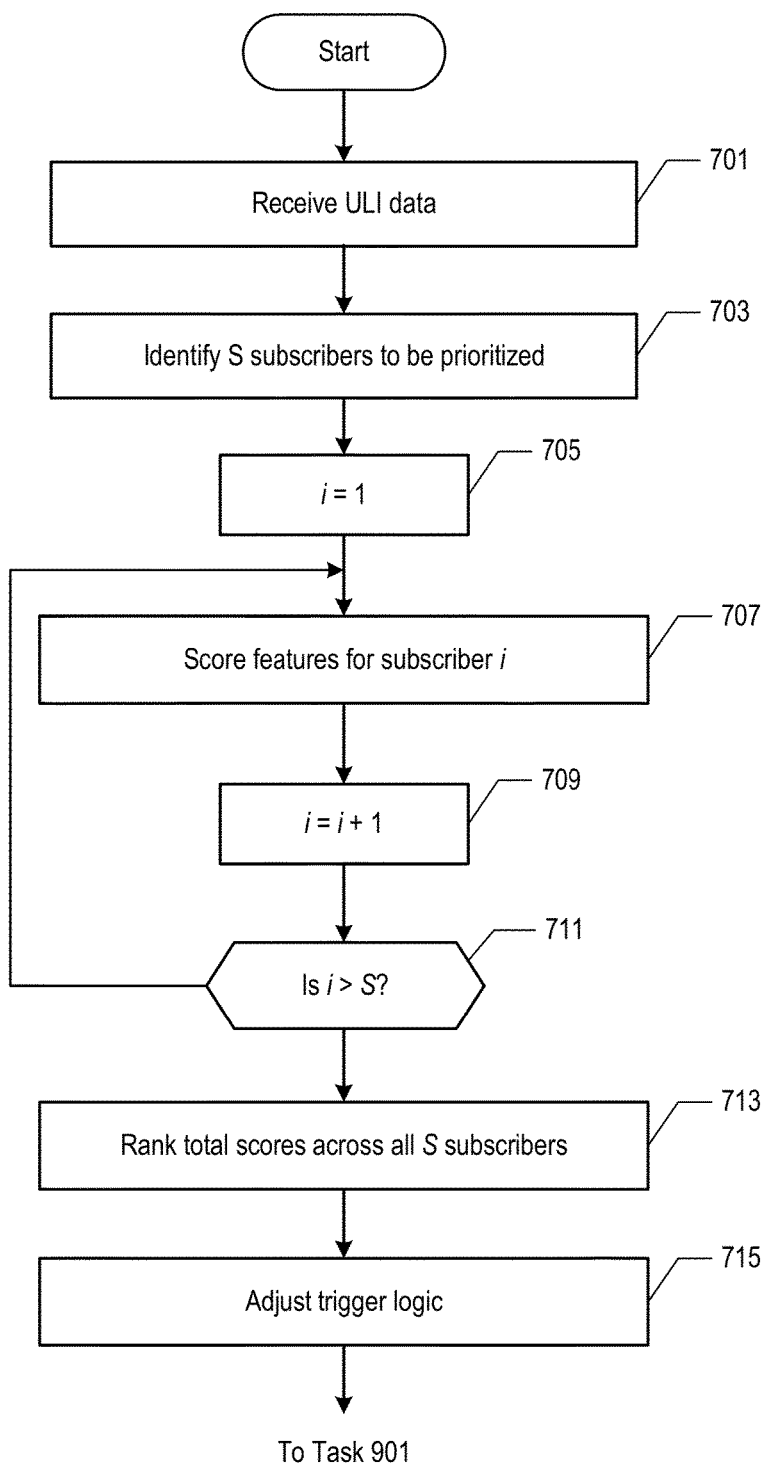
FIG. 7 depicts a flowchart of method 700 for ranking subscribers of system 200.

FIG. 7 depicts a flowchart of method 700 for ranking subscribers of system 200. In accordance with operation 701, scheduling engine 302 receives ULI data from ULI database 305, for a predetermined time span (e.g., a given day, etc.).

In accordance with operation 703, scheduling engine 302 receives (e.g., from a user, etc.) information identifying which S subscribers are to be ranked.

After initializing index i to one, scheduling engine 302 scores one or more features for subscriber i, in accordance with operation 707. Operation 707 is described below and regarding FIG. 8.

Scheduling engine 302 proceeds to score one or more features for the other subscribers as well. In all, engine 302 calculates total feature scores for all S subscribers.

In accordance with operation 713, scheduling engine 302 sorts the total feature scores across all S subscribers, creating a subscriber ranking.

In accordance with operation 715, scheduling engine 302 adjusts the trigger logic, which refers to logic that gains access to the input stream or to platform events, and detects certain conditions that cause a subscriber to get an immediate score recalculation. For example, an addition of a subscriber IMSI to a black list causes an immediate recalculation of the black-list score and, therefore, a recalculation of the total score for this subscriber.

Control of task execution then proceeds to task 901.

Figure 8:
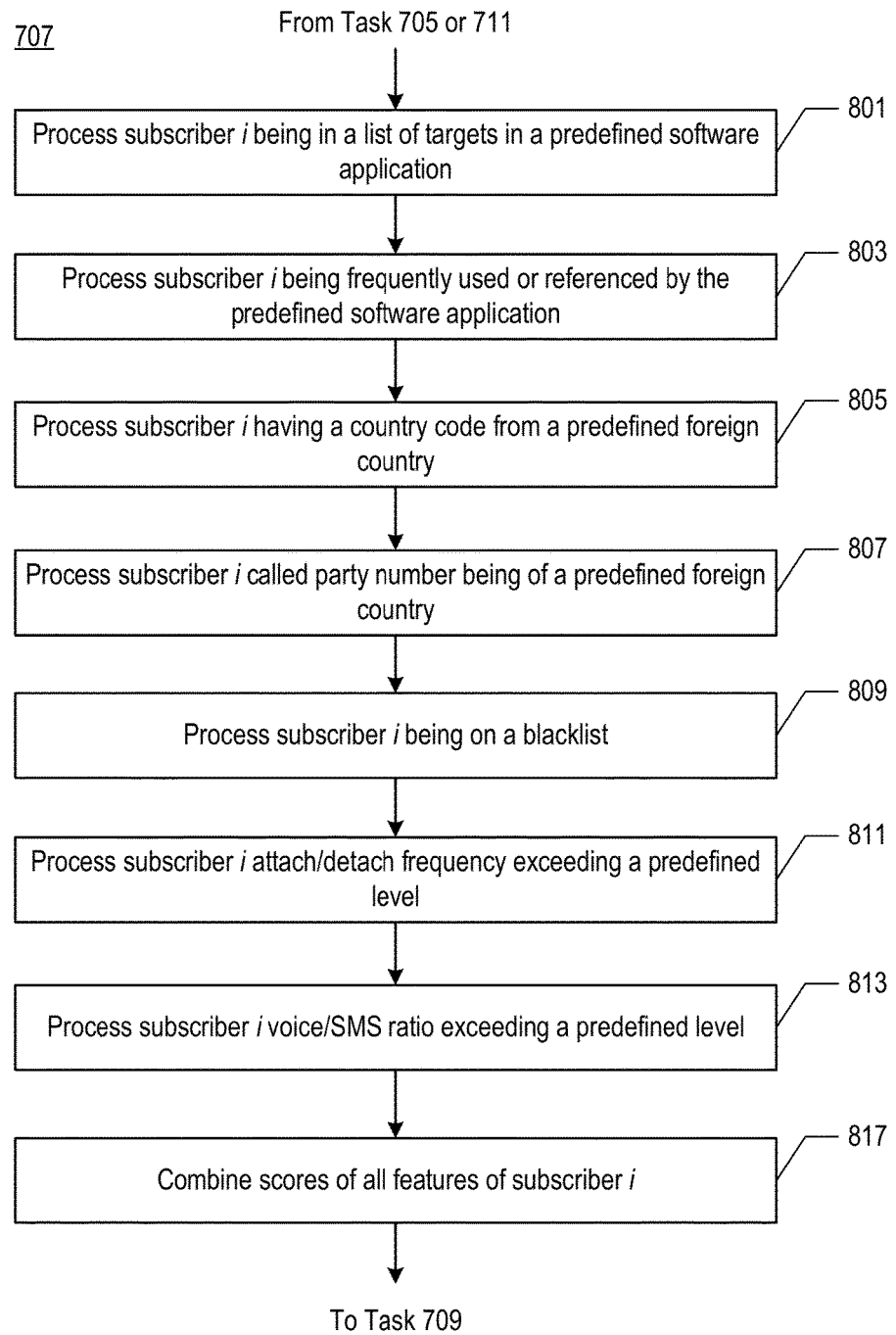
FIG. 8 depicts a flowchart of operation 707 for calculating a total feature score for subscriber i.

FIG. 8 depicts a flowchart of operation 707 for calculating a total feature score for subscriber i. Scheduling engine 302 references subscriber i by using an identifier that uniquely identifies the subscriber. In accordance with the illustrative embodiment, scheduling engine 302, and at least some of the other data-processing systems disclosed herein, uses an international mobile subscriber identity (IMSI) to uniquely identify the wireless subscriber. As those who are skilled in the art will appreciate, after reading this specification, other identifiers can be used for identifying the subscriber.

In accordance with operation 801, scheduling engine 302 accounts for whether the identifier of subscriber i is in a list of targets maintained by a predefined software application.

In accordance with operation 803, scheduling engine 302 accounts for whether the identifier of subscriber i is frequently used or referenced by the predefined software application.

In accordance with operation 805, scheduling engine 302 accounts for whether the identifier of subscriber i has a country code from a predefined foreign country.

In accordance with operation 807, scheduling engine 302 accounts for whether the called party number called by subscriber i is of a predefined foreign country.

In accordance with operation 809, scheduling engine 302 accounts for whether subscriber i is on a blacklist.

In accordance with operation 811, scheduling engine 302 accounts for whether an attach and/or detach frequency (i.e., rate of occurrence) associated with subscriber i exceeds a predefined level. A daily average for attach and detach is computed for every subscriber being analyzed. Then, a histogram is generated—that is, the subscriber frequencies (counts) that have various average ranges (e.g., in steps of 0.5, etc.). The score can be based on highlighting the top P percentile (e.g., P is equal to 2, etc.). If the top P percent has an attach/detach count of 9.5 or more (as an example), and the top 2*P percent has a count of 7.0 or more (as an example), then the score can be set at 0.0 (or the minimum) for an attach/detach count of less than 7.0, the score can be made linear from 0.0 to 1.0 for a count that is between 7.0 and 9.5, and the score can be set at 1.0 (or the maximum) for subscribers with a count above 9.5. Low percentiles ensure that if this criterion becomes more common, it does not push up the scores of more than 2 to 4% of the subscribers for P being equal to 2.

In accordance with operation 813, scheduling engine 302 accounts for whether a voice-to-SMS (short message service) ratio associated with subscriber i exceeds a predefined level. A daily average for voice and SMS calls is computed for every subscriber being analyzed. The ratio of voice calls (VC) to SMS calls is computed. Then, a histogram is generated—that is, the subscriber frequencies (counts) that have various average ranges for the ratio (e.g., in steps of 0.5, etc.). The score can be based on highlighting the top (or bottom) P percentile (e.g., P is equal to 2, etc.). If the VC/SMS ratio is above the top P percent or below the bottom P percent, the score can be set at 1.0 (or the maximum). If the ratio is outside the 2*P percent top and bottom, the score can be set at 0.0 (or the minimum). The score can be made linear in between. Low percentiles ensure that if this criterion becomes more common, it does not push up the scores of more than 2 to 4% of the subscribers for P being equal to 2.

In accordance with operation 817, scheduling engine 302 combines the scores associated with operations 801 through 813, resulting in a total feature score for subscriber i.

The total feature score of subscriber i can be calculated from the individual scores of features f as follows:

$$\text{Total\_Score}_i = \Sigma_f \text{Score}(f)_i * w_f / \Sigma_f w_f, \quad \text{(equation 1)}$$

wherein $w_f$ is the weight, or importance, of feature f.

Control of task execution then proceeds to task 709.

Figure 9:
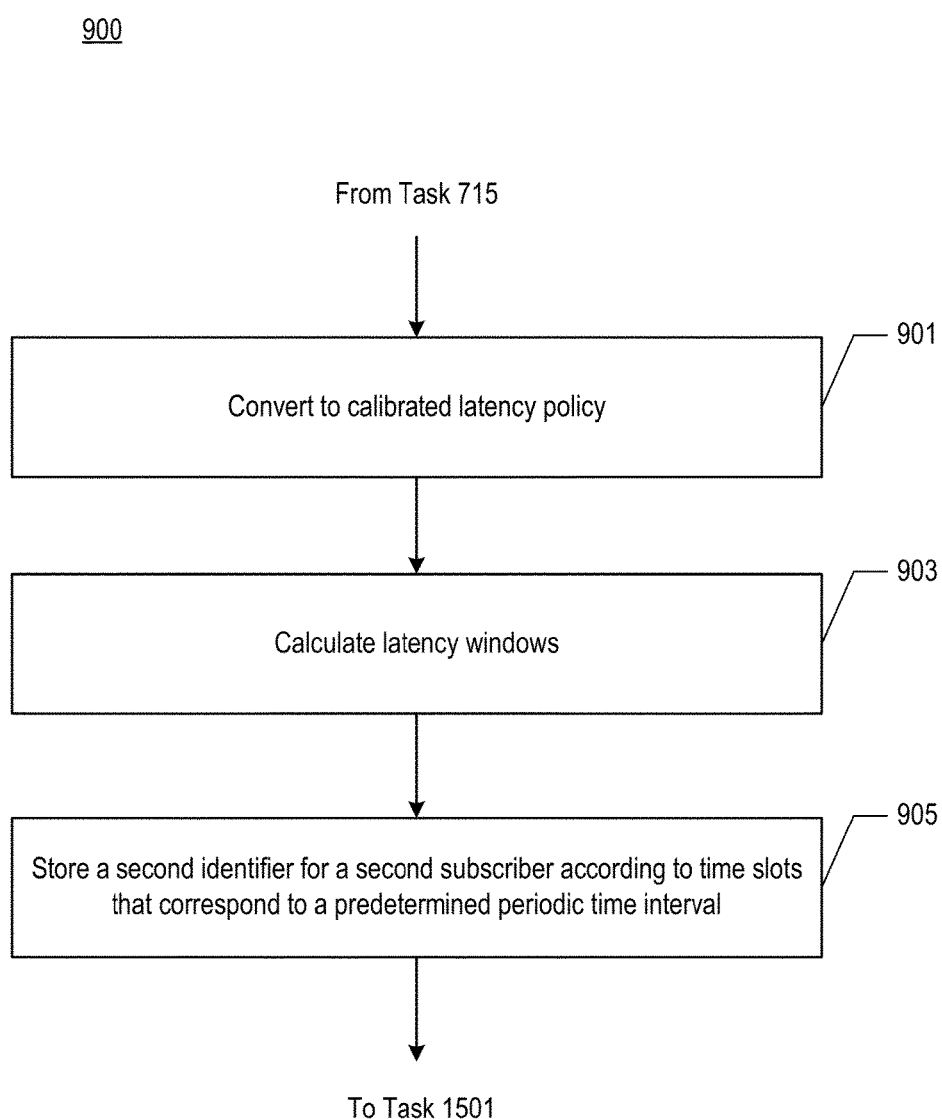
FIG. 9 depicts a flowchart of method 900 for preparing and transmitting MT-LR triggers, based on the ranking performed in regard to method 700.

FIG. 9 depicts a flowchart of method 900 for preparing and transmitting MT-LR triggers, based on the ranking performed in regard to method 700.

In accordance with operation 901, scheduling engine 302 converts to a calibrated latency policy, wherein "latency" in this context is defined as the amount of time between successive location fixes for a subscriber. The desired latency policy is specified by providing a set of latencies and number of subscribers under each latency. For instance, a user of scheduling engine 302 can specify that 15-minute latency be applied to 20K subscribers and 90-minute latency be applied to 135K subscribers. Additionally, the user can specify the total number of subscribers in the system (e.g., 4.5 million, etc.) and the limit of MT-LR transactions per second (TPS) (e.g, 150 TPS, etc.). With these parameters specified, scheduling engine 302 determines a calibrated (or final) latency policy that conforms to the MT-LR TPS limit.

In accordance with operation 903, scheduling engine 302 calculates multiple latency windows based on the calibrated latency policy. The latency windows are windows (or ranges) in the subscriber rank determined at operation 713. Thus, from the illustrative numbers provided above, the top-ranked 20K subscribers represent those who will have a latency of 15 minutes; this is the first latency window.

The second latency window comprises the 135K subscribers who are ranked just below the top-ranked 20K subscribers. Additional latency windows can be determined in a similar fashion.

Once the latency windows are defined, scheduling engine 302 is able to issue MT-LR requests periodically, such as every second, by scanning each latency window.

In accordance with operation 905, scheduling engine 302 issues MT-LR triggers to LCS client 303 from the multiple latency windows calculated in accordance with operation 903. To issue MT-LR requests every second, per the latency windows determined at operation 903 and based on the illustrative subscriber numbers presented above, scheduling engine 303 selects 22 (rounded down) subscribers from the first latency window, 25 subscribers from the second latency window, and so on, in order to total 150 transactions for that particular second of time.

As those who are skilled in the art will appreciate, after reading this specification, scheduling engine 302 can issue the MT-LR triggers to a different data-processing system than LCS client 303.

Control of task execution then proceeds to task 1501.

Figure 10:
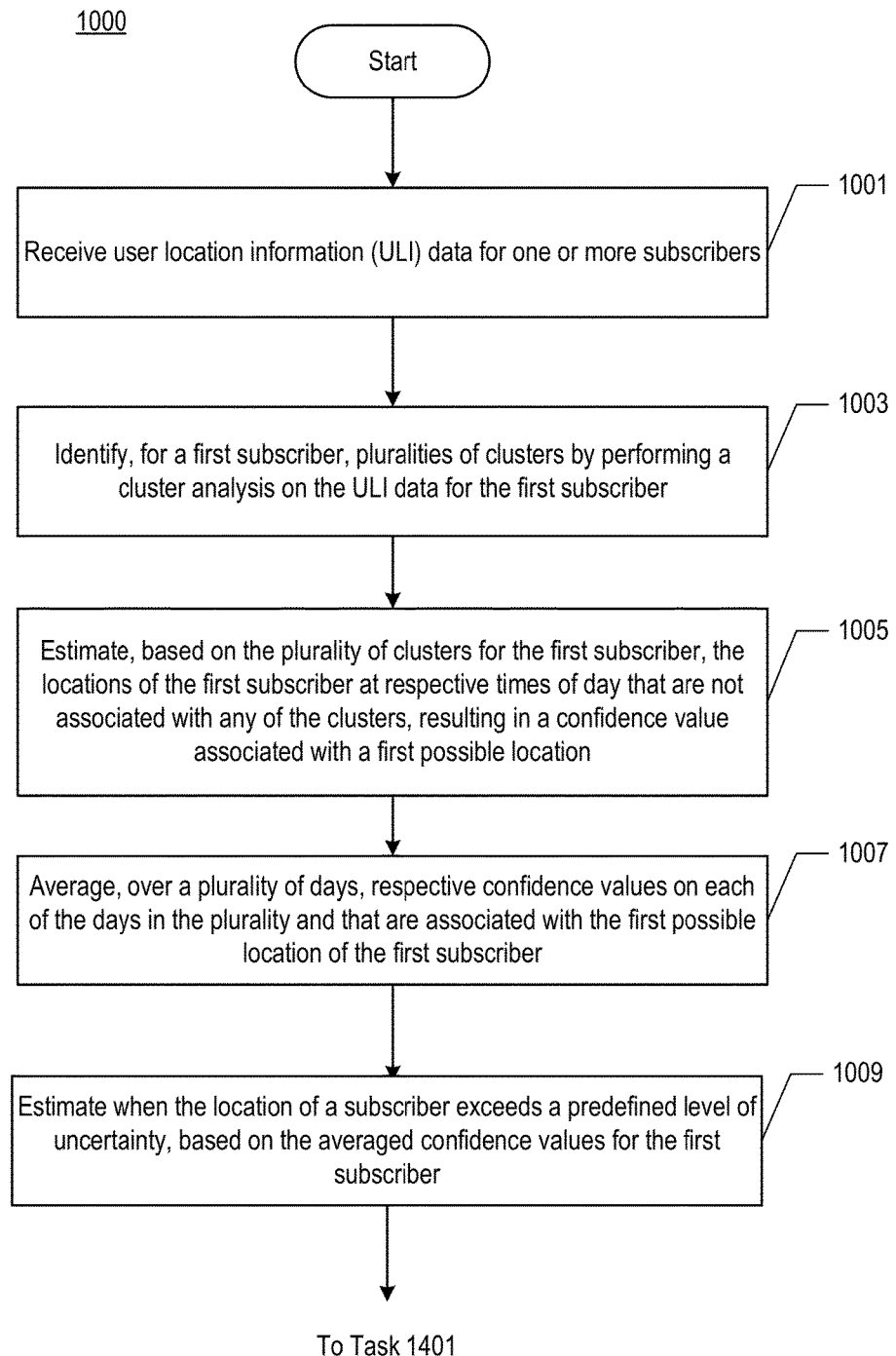
FIG. 10 depicts a flowchart of method 1000 for predicting when MT-LR triggers should be sent for various wireless subscribers of system 200.

FIG. 10 depicts a flowchart of method 1000 for predicting when MT-LR triggers should be sent for various wireless subscribers of system 200. For clarity purposes, the operations associated with a first subscriber are disclosed; however, similar operations can be performed for additional subscribers.

In accordance with operation 1001, scheduling engine 302 receives ULI data from ULI database 305 for one or more subscribers, including a first subscriber, for a predetermined time span (e.g., a given day, etc.). Each event-specific component of the ULI data can comprise an event as described earlier, a location at which the event occurred, and a time of day and date at which the event occurred.

In accordance with operation 1003, scheduling engine 302 identifies a plurality of clusters for the first subscriber, based on performing a cluster analysis, or "clustering," on a set of ULI data corresponding to the first subscriber. Clustering can be used to identify "stay points," each of which being a separate place (e.g., "home", "workplace", etc.) where a subscriber spends a significant amount of time as defined by an identified cluster. Engine 302 identifies the plurality of clusters such that the clusters are representative of location of the first subscriber and are identified as a function of time.

In accordance with the illustrative embodiment, engine 302 performs a cluster analysis based on density-based clustering and, in particular, by using "DBSCAN" as is known in the art. Parameter values that can be used for DBSCAN are "epsilon" having a value of 0.60 and "minPoints" having a value of 6, for example and without limitation. The inventors have observed that these values minimize or avoid i) the inclusion of location data points from the noise near borders, ii) the creation of clusters in a noise region, and iii) the breaking up of a band into too many clusters.

Figure 11:
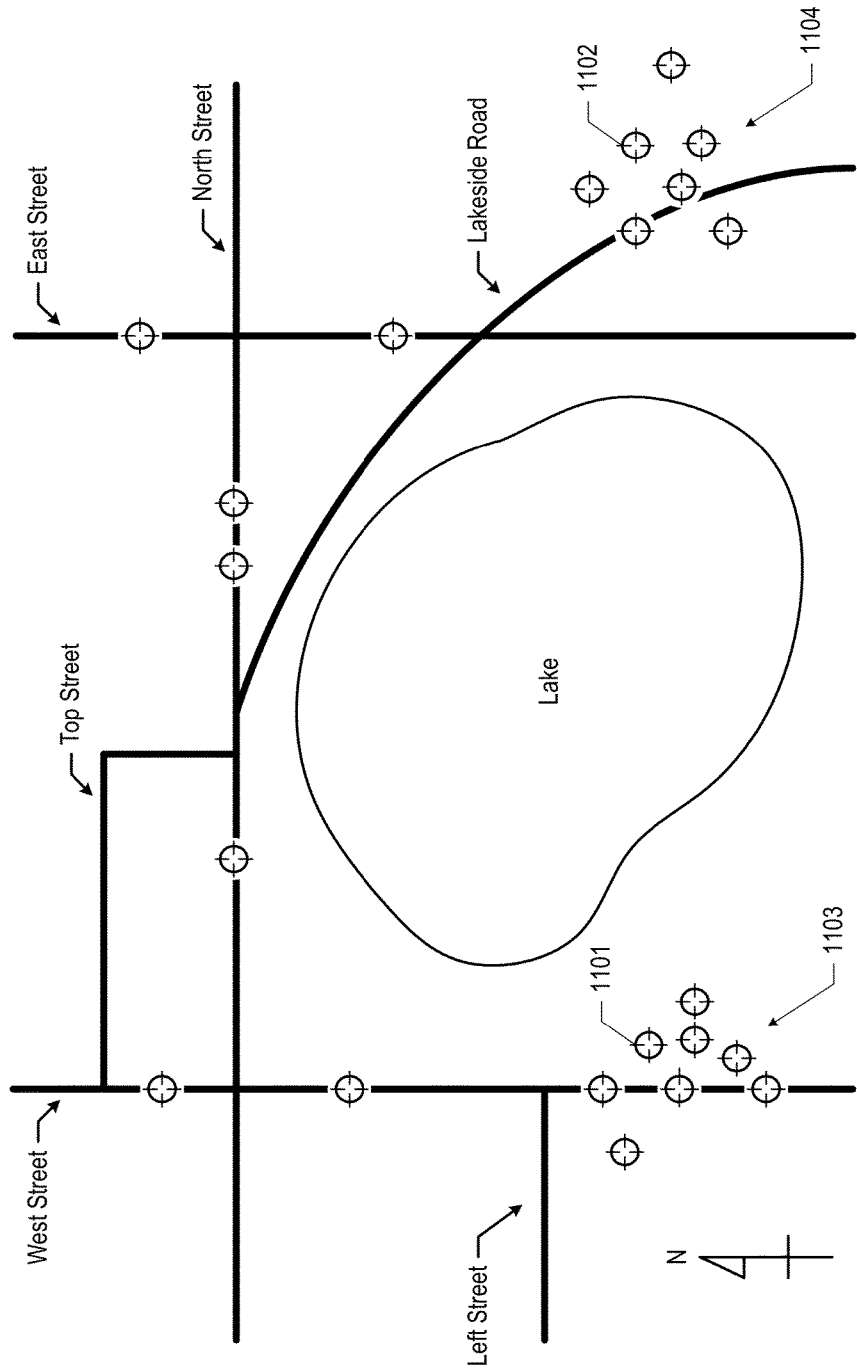
FIG. 11 depicts a road map of geographic region 220 in which many locations corresponding to ULI events are indicated.

The concept of a cluster, as is pertains to location, is further described here. FIG. 11 depicts a road map of geographic region 220 in which many locations corresponding to ULI events are indicated, wherein the times at which those events occurred are also known. The ULI events involve the wireless terminal of the first subscriber and signify location fixes for the first subscriber in relation to the roadmap, including ULI events 1101 and 1102. ULI event 1101 is one of many events (eight total) that make up cluster 1103, which corresponds to the home of the first subscriber (i.e., the "home" stay point). ULI event 1102 is one of many events (seven total) that make up cluster 1104, which corresponds to the workplace of the first subscriber (i.e., the "workplace" stay point). There are additional ULI events depicted, which do not necessarily correspond to clusters, but which can occur i) while the subscriber travels around region 220 (i.e., is in transit), such as between home and work, or ii) when the subscriber is stopped at a place (e.g., a gas station, a convenience store, etc.) but not long enough or often enough for the place to be considered a "stay point" as identified by a cluster.

Clusters 1103 and 1104 in FIG. 11 are identified based on performing the cluster analysis described earlier and are representative of locations (e.g., a street address, a set of geographical coordinates, etc.). In some embodiments of the present invention, the clusters can be representative of places (e.g., home, work, place of worship, etc.). Furthermore, because the times of occurrences of the data points in the clusters are known, the clusters can be represented on a timeline. For example, the subscriber might be determined (with a high enough probability) to be at a "home" cluster at one or more particular spans of calendrical times during a 24-hour day, at a "workplace" cluster at one or more other spans of calendrical times, and so on.

By representing the clusters on a timeline, as discussed below, the clusters can be identified and represented as a function of time, and so can additional information as described later.

In accordance with operation 1005, scheduling engine 302 estimates the locations of the first subscriber at respective times of day that are not associated with any of the clusters in the plurality identified, including a first time of day. A time of day (TOD) that is not associated with any identified cluster means, in the very least, that the unassociated TOD is outside of the one or more spans of time that apply to the clusters. The estimating results in a confidence value associated with a first possible location at the first time of day on a calendrical date or on a day of the week.

Figure 12:
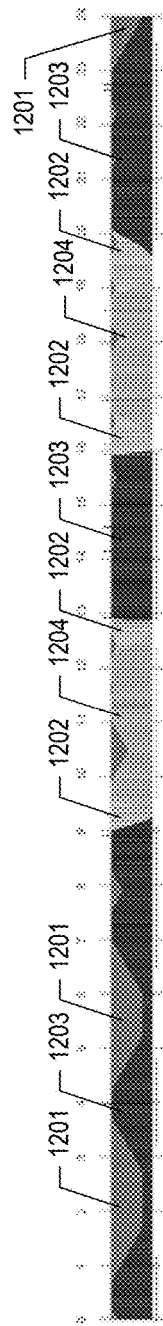
FIG. 12 depicts a timeline that represents confidence values as a function of time through a 24-hour day on a particular date.

FIG. 12 depicts a timeline that represents confidence values as a function of time through a 24-hour day on a particular date, as estimated in accordance with operation 1005. The confidence values for a given category of possible location (e.g., "home", "work", "unknown", etc.) are referred to as "bands", which can comprise multiple, non-contiguous segments. Confidence band 1201 represents the probability that the location of the first subscriber is unknown and, hence, represents an uncertainty in the location of the subscriber. Confidence band 1202 represents the probability that the first subscriber is in transit between clusters and, hence, is not associated with any cluster. Confidence band 1203 represents the probability that the location of the first subscriber is "home." Confidence band 1204 represents the probability that the location of the first subscriber is "work."

Scheduling engine 302, in essence, creates the depicted timeline by interpolating new data points at new points in time, in between or in addition to the data points directly representing the clusters that were already represented as a function of time and in accordance with operation 1003. In some embodiments of the present invention, a confidence band can be created for an identified cluster, wherein the confidence band is assigned a relatively high value during a span of times that coincides with the cluster, thereby reflecting that the identified cluster provides strong empirical evidence (having been identified from the ULI data) that the subscriber is probably at the place (e.g., "home", "workplace", etc.) corresponding to the cluster. The confidence band can be assigned relatively lower values outside of the time span of the cluster. This reflects that the subscriber is less likely at one of the places for which clusters have been identified, meaning that the subscriber might be, for example, in transit, at an infrequently visited place, at an unknown place, and so forth.

For example, the created confidence band for the "home" cluster (i.e., reflecting the probability that the subscriber is at home) might have a confidence value of 90 percent between the hours of 11:00 pm and 8:00 am, a confidence value of 10 percent between the hours of 9:30 am and 6:00 pm, and levels that transition from 10 percent to 90 percent in-between the clusters. Similarly, the created confidence band for the "workplace" cluster (i.e., reflecting the probability that the subscriber is at the workplace) might have a confidence value of 80 percent between the hours of 10:00 pm and 1:00 pm and between the hours of 2:30 pm and 5:00 pm, a confidence value of 20 percent between the hours of 7:00 pm and 6:00 am, and levels that transition from 20 percent to 80 percent in-between the clusters. Additional confidence bands can be created for other identified clusters, or for other possible locations (e.g., "in transit", "unknown", etc.) in general.

As those who are skilled in the art will appreciate after reading this specification, each confidence band created can have a transition between different values at different spans of time. The transitions can be based on whether the transition is between two clusters in time that are of the same place (e.g., subscriber leaves the home cluster then comes back to the home cluster) or of different places (e.g., subscriber leaves the home cluster and travels to the workplace cluster), or can be based on something else entirely.

In accordance with operation 1007, scheduling engine 302 averages, over a plurality of days (e.g., every Tuesday for eight weeks, every Saturday for 10 weeks, etc.), the respective confidence values on each of the days in the plurality and obtained at operation 1005. The averaged confidence values are those that are associated with the first possible location (e.g., "home", etc.) of the first subscriber at the first time of day (e.g., 8:00 am, etc.), including the confidence value associated with the first calendrical date referred to in operation 1005. In doing so, scheduling engine 302 attempts to predict the likelihood of where the first subscriber will be, at a given time and on a given day of the week in the future.

Figure 13:
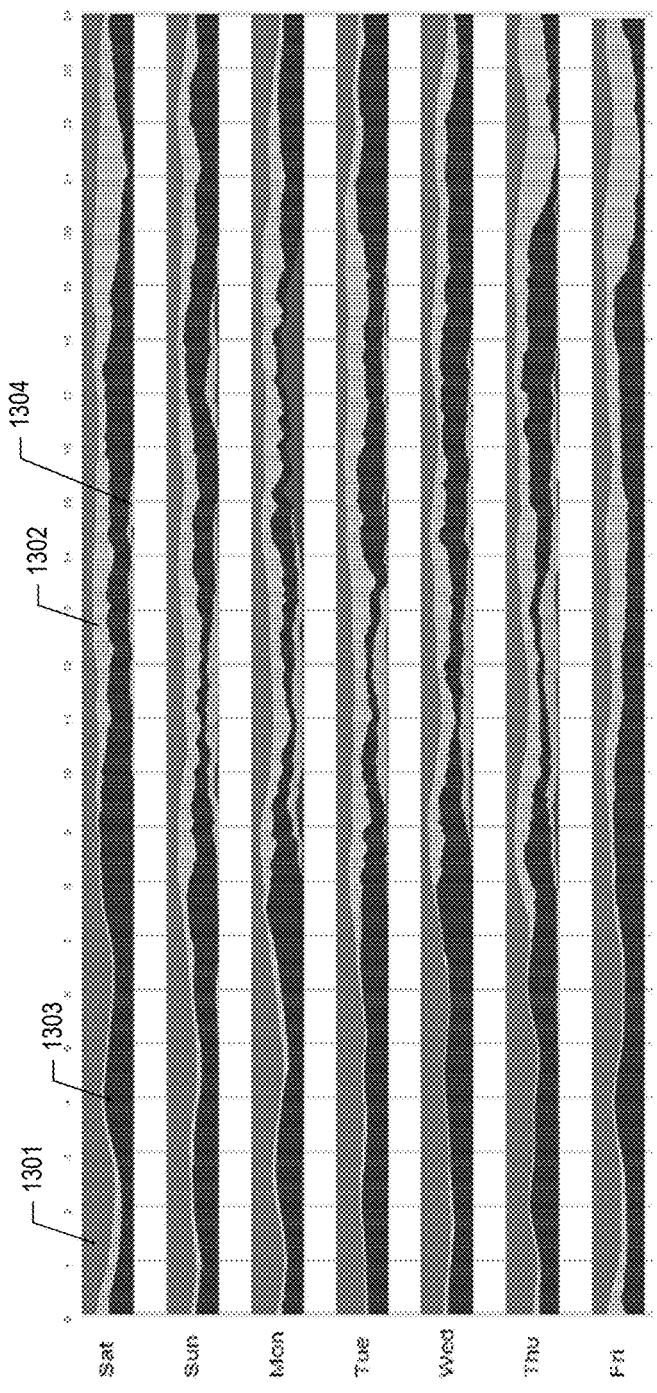
FIG. 13 depicts timelines, one for each day of the week, representing averaged confidence values as a function of time through a 24-hour day.

FIG. 13 depicts timelines, one for each day of the week, representing averaged confidence values as a function of time through a 24-hour day, as averaged in accordance with operation 1007. The averaged confidence values for a given category of possible location (e.g., "home", "work", "unknown", etc.) are referred to as "bands", which can comprise multiple, noncontiguous segments. Averaged confidence band 1301 represents the probability that the location of the first subscriber is unknown and, hence, represents an uncertainty in the location of the subscriber. Confidence band 1302 represents the probability that the first subscriber is in transit between clusters and, hence, is not associated with any cluster. Confidence band 1303 represents the probability that the location of the first subscriber is "home." Confidence band 1304 represents the probability that the location of the first subscriber is "work." Essentially, each confidence band is a prediction of the likelihood of the first subscriber being at that location, at a given time and on a given day of the week.

In accordance with operation 1009, scheduling engine 302 estimates when the location of the first subscriber exceeds a predefined level of uncertainty (e.g., 50 percent, 65 percent, etc.), as a function of time, based on the averaged confidence values obtained at operation 1007. In some embodiments of the present invention, the predefined level of uncertainty is non-zero.

In some embodiments of the present invention, this is related to estimating the probability of a future event occurring that yields ULI data for the first subscriber, in that the uncertainty in location of the subscriber is based on a prediction that there will not be an event occurring with which to determine the subscriber's location. The lower the probability is of the event occurring, the more the uncertainty is of the location and the more the need is to issue an MT-LR trigger. Such events are discussed above and in regard to ULI database 305.

Control of task execution then proceeds to operation 1401.

Figure 14:
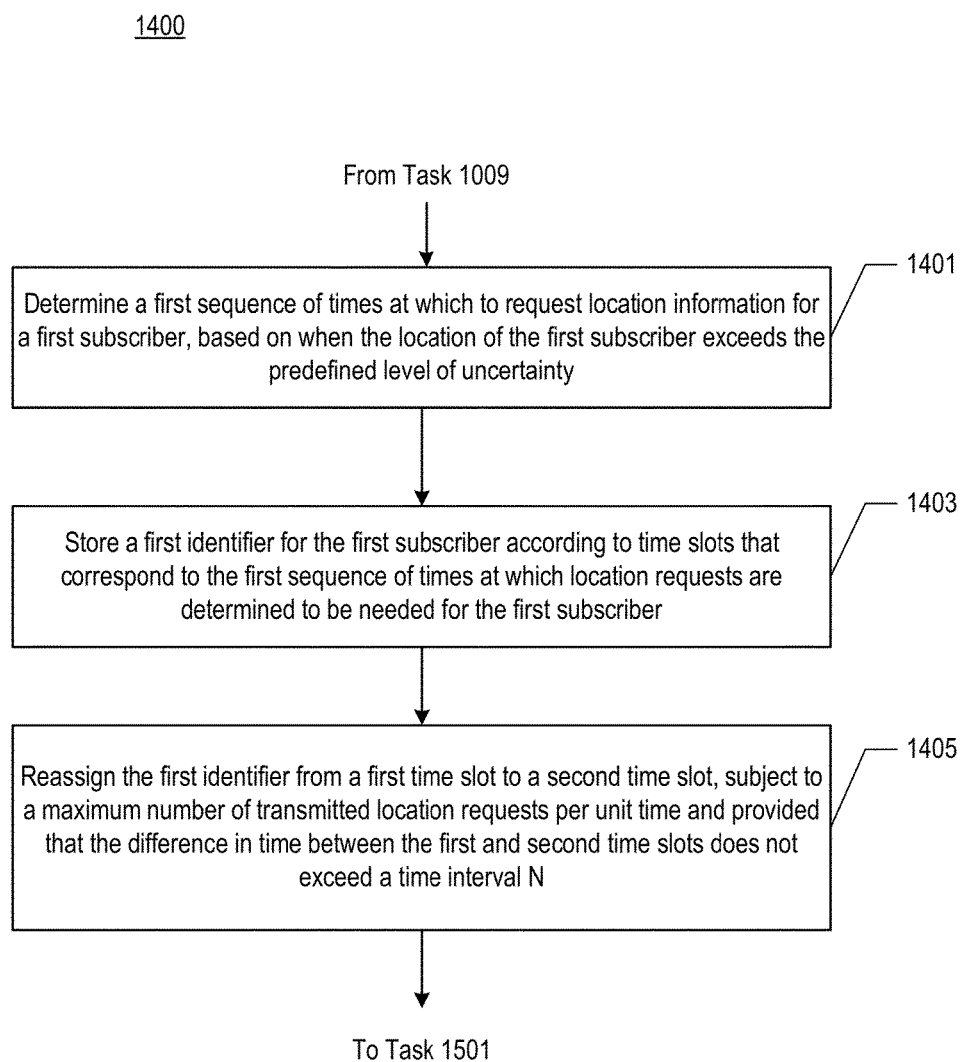
FIG. 14 depicts a flowchart of method 1400 for scheduling MT-LR triggers to be sent, based on the estimate of location uncertainty received from predictive engine 603.

FIG. 14 depicts a flowchart of method 1400 for scheduling MT-LR triggers to be sent, based on the estimate of location uncertainty received from predictive engine 603. For clarity purposes, the operations associated with a first subscriber are disclosed; however, similar operations can be performed for additional subscribers.

In accordance with operation 1401, scheduling engine 302 determines a first sequence of times at which to request location information for the first subscriber. This can be accomplished by estimating when the location of the first subscriber exceeds the predefined level of uncertainty, as performed in accordance with operation 1009. In some embodiments of the present invention, the sequence of times at which to request location information is dependent on the predefined level of uncertainty being exceeded for at least an interval M (e.g., 60 minutes, 30 minutes, etc.).

In accordance with operation 1403, scheduling engine 302 stores, into a computer memory (e.g., in a computer server, etc.), a first identifier for the first subscriber according to time slots that correspond to the first sequence of times at which location requests are determined to be needed for the first subscriber. For example, each portion of the computer memory that is used corresponds to a different time slot; a queue is a non-limiting example of such a storage structure. As identifiers for additional subscribers are also being stored according to time slots, it is contemplated that many identifiers can be associated with a given time slot; this can affect the reassignment of identifiers across time slots as described below.

In some embodiments of the present invention, identifiers that correspond to ranked subscribers are also stored in the same time slots as are the identifiers that correspond to the predictive process disclosed herein. Consequently, both types of identifiers are subject to, or at least are influential in, the reassignment of identifiers across time slots as described below.

In accordance with operation 1405, scheduling engine 302 reassigns the first identifier from a first time slot to a second time slot, subject to a maximum number of transmitted locations requests per unit time. Scheduling engine 302 reassigns the first identifier, provided that the difference in time between the first and second time slots does not exceed a time interval N (e.g., 15 minutes, etc.). In some embodiments of the present invention, time interval M is longer than time interval N, while in some other embodiments M is greater than or equal to 4*N, while in yet some other embodiments M and N have some other relationship to each other.

Reassigning across time slots can be performed in order to redistribute request peak times into nearby times (i.e., to accomplish smoothing over time). A benefit of this is to promote an even throttling of subscriber identifiers when a maximum rate of MT-LR transactions per second (e.g., 150 TPS, etc.) to be issued by scheduling engine 302 is being exceeded.

The reassigning can be implemented via the following steps, in which the concept is to select 150 MT-LRs, assuming that the maximum rate of MT-LR transactions per second is 150. First, scheduling engine 302 can select, from time slot T, all MT-LR requests with a zero "count", up to 75 (or half the max rate) and then increment the "count" for the corresponding subscriber identifier or identifiers. Engine 302 can then perform the selection for each timeslot (e.g., spaced one second apart from one another, etc.) from T-plus-1 sec., then T-minus-1 sec., until plus/minus 7 minutes are spanned. Engine 302 can then select the identifiers with "count" equal to 1, then "count" equal to 2, and so on, until the total subscriber selections are 150. As those who are skilled in the art will appreciate after reading this specification, other methods of implementing the reassigning across time slots can be used.

Control of task execution then proceeds to operation 1501.

Figure 15:
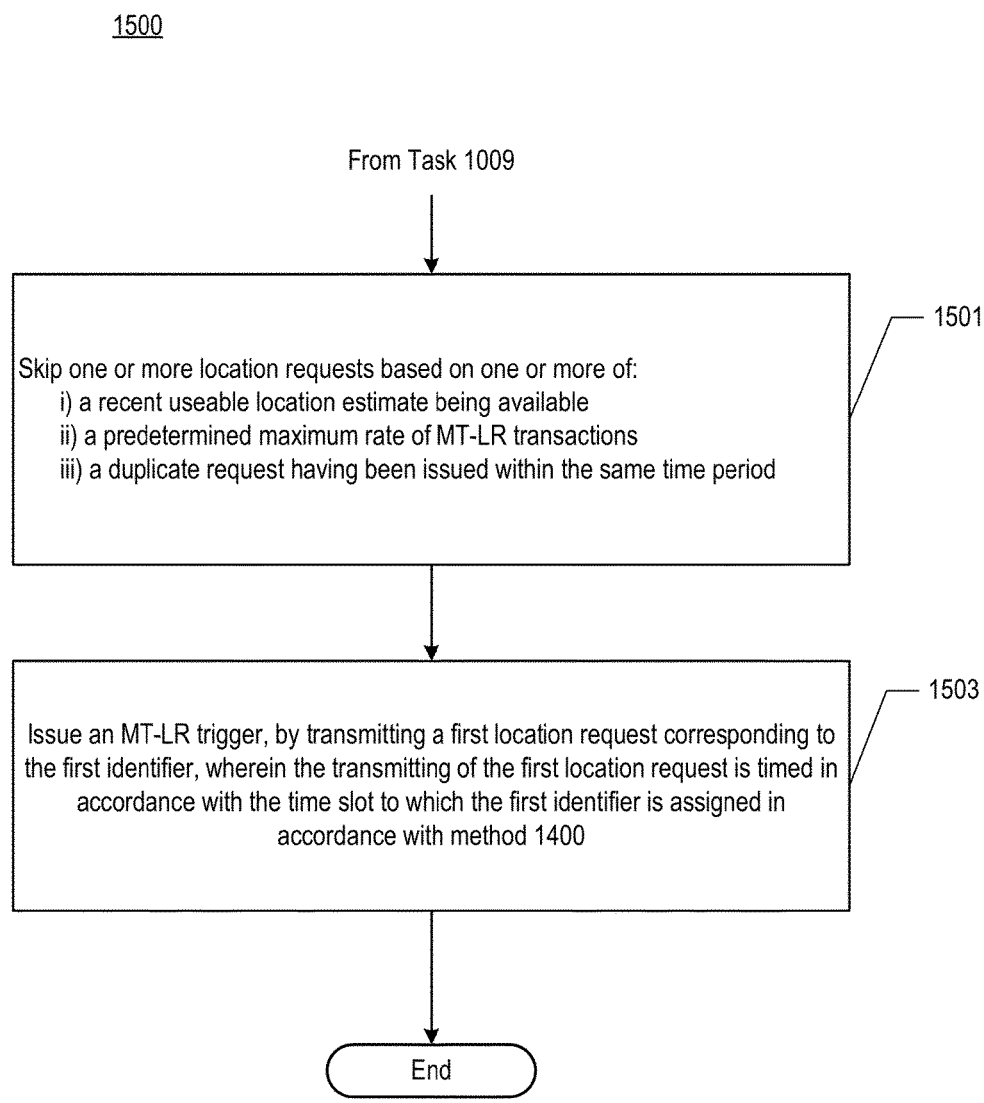
FIG. 15 depicts a flowchart of method 1500 for transmitting MT-LR triggers, based on the triggers it receives from priority MT-LR scheduler 602 and predictive MT-LR scheduler 604.

FIG. 15 depicts a flowchart of method 1500 for transmitting MT-LR triggers, performed by location request mixer 605 based on the triggers it receives from priority MT-LR scheduler 602 and predictive MT-LR scheduler 604, and subject to certain constraints disclosed herein. In some embodiments of the present invention, at least some of the operations depicted in FIG. 15 are performed as part of scheduler 602 or scheduler 604 of scheduling engine 302, or by a different data-processing system entirely such as LCS client 303. For clarity purposes, the operations associated with a first subscriber are disclosed; however, similar operations can be performed for additional subscribers.

In accordance with operation 1501, scheduling engine 302 skips one or more location requests based on a useable location estimate being available from a new set of ULI data (e.g., a set occurring later than what was received at operation 701, etc.), wherein a useable location estimate is one that exceeds a predefined level of accuracy. Engine 302 skips the one or more location requests providing that the useable location estimate corresponds to a time that is within a time interval L (e.g., 15 minutes, etc.) from the time at which the one or more location requests were determined to be needed. In other words, request mixer 605 can skip MT-LR requests if a subscriber has location fix that is i) sufficiently accurate and ii) sufficiently recent. A sufficiently accurate location fix can be obtained by, for example, pattern-matching location estimation based on signal measurements received off of an A-bis interface, as is known in the art, and that are part of the new set of ULI data.

Scheduling engine 302 is further capable of performing one or more of the following functions:
  i. throttling to a predetermined maximum rate of MT-LR transactions per second (e.g., 150 TPS, etc.) to be issued by scheduling engine 302, given the aforementioned skipping,
  ii. adjusting the rate of MT-LR transactions per second to be issued by predictive scheduler 604 (e.g., 103 TPS, etc.),
  iii. skipping duplicate requests (e.g., MT-LRs for the same subscriber issued in the same timeframe by both schedulers 602 and 604, same-subscriber MT-LRs from priority schedule 602 or predictive scheduler 604, etc.), and
  iv. accommodating more than one source network of MT-LR requests (e.g., different telecommunication networks, etc.).

In some embodiments of the present invention, throttling of MT-LR transactions is performed such that MT-LRs based on prioritization have priority over MT-LRs based on prediction. In some other embodiments of the present invention, throttling of MT-LR transactions is performed such that MT-LRs based on prediction have priority over MT-LRs based on prioritization.

In accordance with operation 1503, scheduling engine 302 issues one or more MT-LR triggers. Engine 302 transmits a first location request corresponding to the first identifier, wherein the transmitting of the first location request is timed in accordance with the time slot to which the first identifier has been assigned in accordance with method 1400. In accordance with the illustrative embodiment, scheduling engine 302 issues the trigger or triggers to LCS client 303, which then transmits LCS request 403 to location engine 304 as a result. In some other embodiments of the present invention, scheduling engine 302 transmits the request directly to location engine 304.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
  receiving, by a data-processing system, a first non-empty set of user location information (ULI) data for a first subscriber;
  identifying, by the data-processing system, a plurality of clusters for the first subscriber, by performing a cluster analysis on the first set of ULI data such that the clusters in the plurality of clusters are representative of location of the first subscriber and are identified as a function of time, wherein the plurality of clusters comprises a first cluster that is associated with a first location and a first time of day and a second cluster that is associated with a second time of day;
  estimating, by the data-processing system, when the location of the first subscriber exceeds a predefined, non-zero level of uncertainty, as a function of time, based on the plurality of clusters for the first subscriber, wherein the estimating of when the location exceeds the pre- defined level of uncertainty comprises estimating, based on the first and second cluster, the location of the first subscriber at a third time of day; and transmitting, by the data-processing system, a first location request to a location engine, corresponding to the first subscriber, wherein the transmitting of the first location request is based on an estimate of when the location exceeds the predefined level of uncertainty.

2. The method of claim 1 wherein the estimating of the location of the first subscriber at the third time of day comprises estimating a confidence value that the first subscriber is at the first location.

3. The method of claim 2 wherein the second cluster is further associated with a second location, and wherein the estimating of the location of the first subscriber at the third time of day further comprises estimating a confidence value that the first subscriber is at the second location.

4. The method of claim 1 wherein no cluster is associated with the third time of day.

5. The method of claim 1 wherein the estimating of when the location exceeds the predefined level of uncertainty further comprises averaging, over a plurality of days, the respective confidence values on each of the days in the plurality and that are associated with a first possible location of the first subscriber at the third time of day.

6. The method of claim 5 wherein the estimating of when the location exceeds the predefined level of uncertainty further comprises averaging, over a plurality of days, the respective confidence values on each of the days in the plurality and that are associated with a second possible location of the first subscriber at the third time of day.

7. The method of claim 5 wherein the estimating of when the location exceeds the predefined level of uncertainty further comprises averaging, over a plurality of days, the respective confidence values on each of the days in the plurality and that are associated with the first possible location of the first subscriber at the first time of day.

8. The method of claim 5 the plurality of days is of the same day of the week.

9. The method of claim 1 wherein the cluster analysis is performed using density-based clustering.

10. A method comprising:
receiving, by a data-processing system, a first non-empty set of user location information (ULI) data for a first subscriber;
identifying, by the data-processing system, a plurality of clusters for the first subscriber, by performing a cluster analysis on the first set of ULI data such that the clusters in the plurality of clusters are representative of location of the first subscriber and are identified as a function of time;
estimating, based on the plurality of clusters, the locations of the first subscriber at respective times of day that are not associated with any of the clusters in the plurality;
estimating, by the data-processing system, when the location of the first subscriber exceeds a predefined, non-zero level of uncertainty, as a function of time, based on the estimated locations of the first subscriber at the respective times of day; and
transmitting, by the data-processing system, a first location request to a location engine, corresponding to the first subscriber, wherein the transmitting of the first location request is based on an estimate of when the location exceeds the predefined level of uncertainty.

11. The method of claim 10 wherein the estimating of the location of the first subscriber at each of the respective times of day further comprises estimating a confidence value that the first subscriber is at a first possible location at a first time of day.

12. The method of claim 11 wherein the estimating of when the location exceeds the predefined level of uncertainty comprises averaging, over a plurality of days, the respective confidence values on each of the days in the plurality and that are associated with the first possible location of the first subscriber at the first time of day.

13. The method of claim 11 wherein the estimating of when the location exceeds the predefined level of uncertainty further comprises averaging, over a plurality of days, the respective confidence values on each of the days in the plurality and that are associated with a second possible location of the first subscriber at the first time of day.

14. The method of claim 11 the plurality of days is of the same day of the week.

15. The method of claim 10 wherein the cluster analysis is performed using density-based clustering.

16. A method comprising:
receiving, by a data-processing system, a first non-empty set of user location information (ULI) data for a first subscriber;
identifying, by the data-processing system, a plurality of clusters for the first subscriber, by performing a cluster analysis on the first set of ULI data such that the clusters in the plurality of clusters are representative of location of the first subscriber and are identified as a function of time;
estimating, based on the plurality of clusters, the locations of the first subscriber at respective times of day that are not associated with any of the clusters in the plurality, including a first time of day, resulting in a confidence value associated with a first possible location at the first time of day on a first calendrical date;
averaging, over a plurality of days, the respective confidence values on each of the days in the plurality and that are associated with the first possible location of the first subscriber at the first time of day, including the confidence value associated with the first calendrical date;
estimating, by the data-processing system, when the location of the first subscriber exceeds a predefined, non-zero level of uncertainty, as a function of time, based on the averaged confidence values; and
transmitting, by the data-processing system, a first location request to a location engine, corresponding to the first subscriber, wherein the transmitting of the first location request is based on an estimate of when the location exceeds the predefined level of uncertainty.

17. The method of claim 16 wherein the estimating of the probability of the future event further comprises averaging, over a plurality of days, the respective confidence values on each of the days in the plurality and that are associated with a second possible location of the first subscriber at the first time of day.

18. The method of claim 16 the plurality of days is of the same day of the week.

19. The method of claim 16 wherein the cluster analysis is performed using density-based clustering.

* * * * *